United States Patent
Sankar et al.

(10) Patent No.: US 9,112,787 B2
(45) Date of Patent: Aug. 18, 2015

(54) FIRST HOP LOAD BALANCING

(75) Inventors: Ramkumar Sankar, Bangalore (IN); Shivaprasath Sundarrajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 13/529,219

(22) Filed: Jun. 21, 2012

(65) Prior Publication Data

US 2013/0343386 A1 Dec. 26, 2013

(51) Int. Cl.
*H04L 12/28* (2006.01)
*H04L 12/56* (2006.01)
*H04L 12/803* (2013.01)
*H04L 12/891* (2013.01)
*H04L 29/08* (2006.01)

(52) U.S. Cl.
CPC .............. *H04L 47/125* (2013.01); *H04L 47/41* (2013.01); *H04L 67/1004* (2013.01); *Y02B 60/33* (2013.01)

(58) Field of Classification Search
CPC ... H04L 12/4641; H04L 12/462; H04L 45/00; H04L 45/16; H04L 45/245; H04L 45/52
See application file for complete search history.

(56) References Cited

U.S. PATENT DOCUMENTS

| | | | |
|---|---|---|---|
| 8,798,055 B1* | 8/2014 | An | 370/390 |
| 2002/0186656 A1* | 12/2002 | Vu | 370/229 |
| 2007/0183415 A1* | 8/2007 | Fischer et al. | 370/389 |
| 2008/0186968 A1* | 8/2008 | Farinacci et al. | 370/392 |
| 2010/0306408 A1* | 12/2010 | Greenberg et al. | 709/238 |
| 2011/0103263 A1* | 5/2011 | Unbehagen et al. | 370/254 |
| 2012/0177054 A1* | 7/2012 | Pati et al. | 370/395.53 |
| 2013/0188514 A1* | 7/2013 | Jain | 370/254 |

* cited by examiner

*Primary Examiner* — Edan Orgad
*Assistant Examiner* — Rebecca Song
(74) *Attorney, Agent, or Firm* — Meunier Carlin & Curfman LLC

(57) ABSTRACT

In an implementation, a packet is received from a network device. A group identifier is retrieved from the received packet. A plurality of layer-2 switch identifiers that are associated with the retrieved group identifier is determined. A switch identifier is selected from the plurality of layer-2 switch identifiers. The received packet is forwarded to a layer-2 switch identified by the selected switch identifier.

19 Claims, 6 Drawing Sheets

FIRST HOP LOAD BALANCING

BACKGROUND

First Hop Redundancy Protocol ("FHRP") allows for transparent fail-over at the first-hop IP router. An FHRP group is created with multiple routers or switches. At least one switch in the group is an active router, and another router in the group is a standby router. There may also be one or more listening routers in the group. The group may be assigned a single virtual IP address, which is provided to each end user associated with the group as a default gateway address. The FHRP provides redundancy, because in the event of a failure of the active router, the standby router, or one of the listening routers, can take over for the active router.

At the layer-2/layer-3 boundary, in current networks, FHRP as described above is used to provide gateway redundancy. In FabricPath networks, there may be 16 or even 32 gateways present in the layer-2 network. In such scenarios, FHRP as described above may not scale or provide dynamic load balancing.

SUMMARY

In an implementation, a packet is received from a network device. A group identifier is retrieved from the received packet. A plurality of layer-2 switch identifiers that are associated with the retrieved group identifier is determined. A switch identifier is selected from the plurality of layer-2 switch identifiers. The received packet is forwarded to a layer-2 switch identified by the selected switch identifier.

Implementations may have some or all of the following features. The group identifier may be a virtual MAC address. Retrieving the group identifier from the received packet by the layer-2 switch may include retrieving the virtual MAC address from a MAC-in-MAC header of the received packet. The received packet may be encapsulated with the selected switch identifier. Encapsulating the received packet may include replacing the virtual MAC address in the MAC-in-MAC header with the selected switch identifier. The plurality of layer-2 switch identifiers may identify layer-2 switches that are Data Center Ethernet switches. Selecting a switch identifier from the plurality of layer-2 switch identifiers may include selecting a switch identifier from the plurality of layer-2 switch identifiers using a load balancing algorithm. Selecting a switch identifier from the plurality of layer-2 switch identifiers may include randomly selecting a switch identifier from the plurality of layer-2 switch identifiers or may be based on a hash of the packet header. The plurality of layer-2 switch identifiers that are associated with the retrieved group identifier may be determined using a mapping of group identifiers to pluralities of layer-2 switch identifiers. An identifier of a layer-2 switch that is unavailable may be received, and the identifier of the layer-2 switch that is unavailable may be removed from the mapping. The network device may be a classic Ethernet device.

In an implementation, a group identifier is received at a layer-2 switch. A plurality of switch identifiers is received at the layer-2 switch. The plurality of switch identifiers is associated with the received group identifier. A mapping from the group identifier to the plurality of switch identifiers is generated by the layer-2 switch. A packet is received by the layer-2 switch. The packet includes the group identifier. The received packet is forwarded to a switch identified by one of the plurality of switch identifiers according to the mapping by the layer-2 switch.

Implementations may include some or all of the following features. The packet may be received from a CE device. The group identifier may be a virtual MAC address. The group identifier may be received using a link state protocol, such as the ISIS protocol. Forwarding the received packet to a switch identified by one of the plurality of switch identifiers according to the mapping may include selecting one of the switch identifiers of the plurality of switch identifiers that maps to the group identifier using a load balancing algorithm, and forwarding the received packet to the switch identified by the selected switch identifier. Forwarding the received packet to a switch identified by one of the plurality of switch identifiers according to the mapping may include randomly selecting one of the switch identifiers of the plurality of switch identifiers that maps to the group identifier, and forwarding the received packet to the switch identified by the selected switch identifier.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
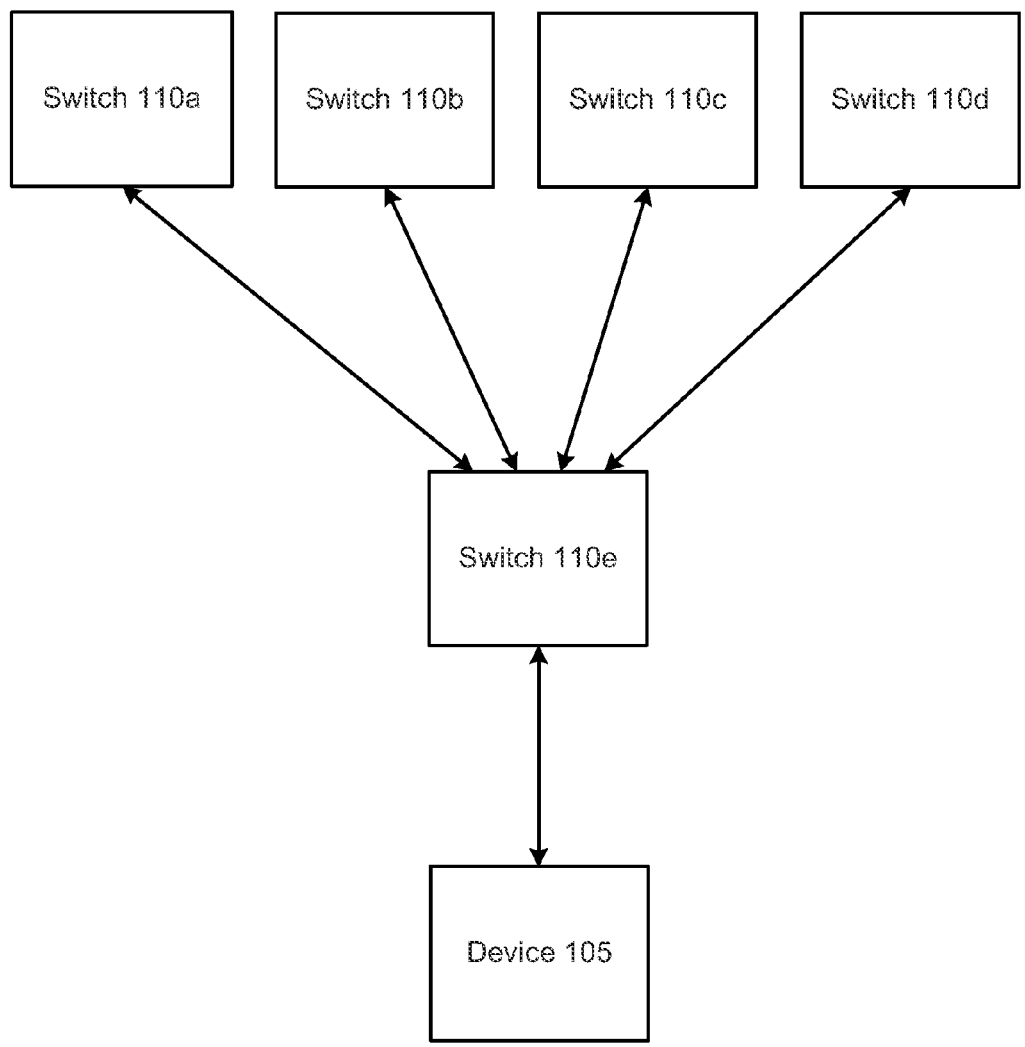
FIG. 1 is an illustration of an example environment implementing a FabricPath network.

FIG. 1 is an illustration of an example environment 100 implementing a FabricPath network. FabricPath is available from Cisco Systems, Inc., San Jose, Calif., and is a pre-standard implementation of the IETF Transparent Interconnection of Lots of Links (TRILL) that provides a standard way to support multi-path Ethernet network. Multi-pathing uses a routing protocol to manage routes between nodes and suppresses broadcast storms. A routing protocol, such as ISIS, establishes a network wide view of the layer-2 network and lets each switch determine the best path through the network for frame. ISIS also supports a basic load balancing algorithm so that multiple paths can be uses simultaneously which should improve application performance and decrease the problems that congestion cause.

Figure 6:
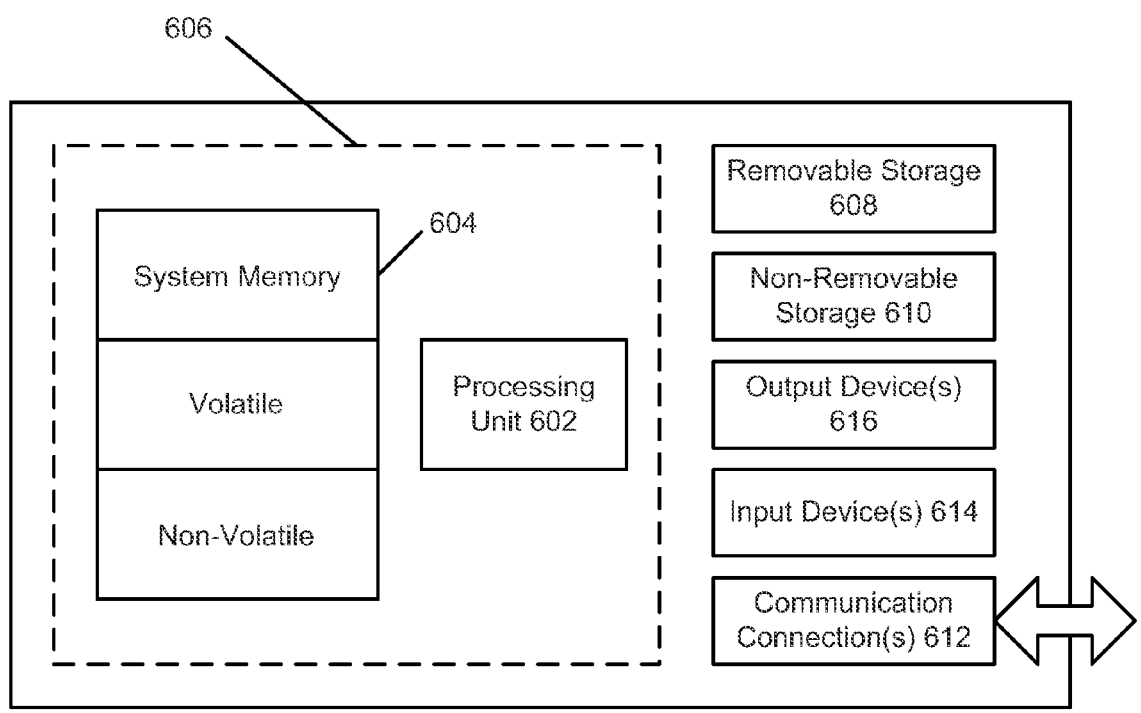
FIG. 6 is an illustration of an example computing environment.

As shown the environment 100 may include a plurality of layer-2 switches 110a-e forming a layer-2 network. Each switch 110a-e in the environment 100 may have a unique switch identifier. The switches 110a-e may be implemented using a variety of general purpose computing devices. Such a device is illustrated in FIG. 6. While only five switches are shown, it is for illustrative purposes only; there is no limit to the number of switches 110 that may be supported in the environment 100.

In the example shown, the layer 2 switches 110a-d are referred to herein as edge switches and may each terminate or switch layer-2 traffic (i.e., packets) for forwarding to a layer-3 network. The switch 110e may receive packets from one or more devices 105, and may forward the received packets to the appropriate edge switch 110a-d. The devices 105 may include a variety of networked devices such as classic Ethernet (CE) devices.

The switches 110a-e may communicate with one another using a variety of protocols including the Intermediate-System-to-Intermediate-System ("ISIS") protocol. Using this protocol, the switches 110a-e as well as communicate with one another to learn about the other switches on the network as well as the network topology. Each of the switches 110a-e may have an ISIS module that implements the ISIS protocol. In some implementations, the ISIS modules of the switches 110a-e may communicate with one another using hello messages.

The switches 110a-e may further include an FHRP module. The FHRP module may be used to group switches into one or more switch or FHRP groups. As will be described further below, the switches 110 in a switch group may be used to provide redundancy and load balancing to the switches 110 in the FabricPath network. The FHRP module may also provide an interface for the creation of switch groups by user or administrators, for example.

The switches 110a-e may further include a layer-2 forwarding module. The layer-2 forwarding module may append routing information to packets or frames sent through the FabricPath network. The appended information may include MAC-in-MAC header information attached to the packet. The MAC-in-MAC information appended to a packet may be removed by the layer-2 forwarding modules of the switches 110a-e before the packet leaves the FabricPath network.

The switches 110 in the environment 100 may be part of anycast infrastructure where multiple instances of a service share a same IP address. The switches 110 may route packets to a topologically nearest instance of a desired service. Layer-3 routing will route the packets to the "nearest" target based upon topology.

Figure 2:
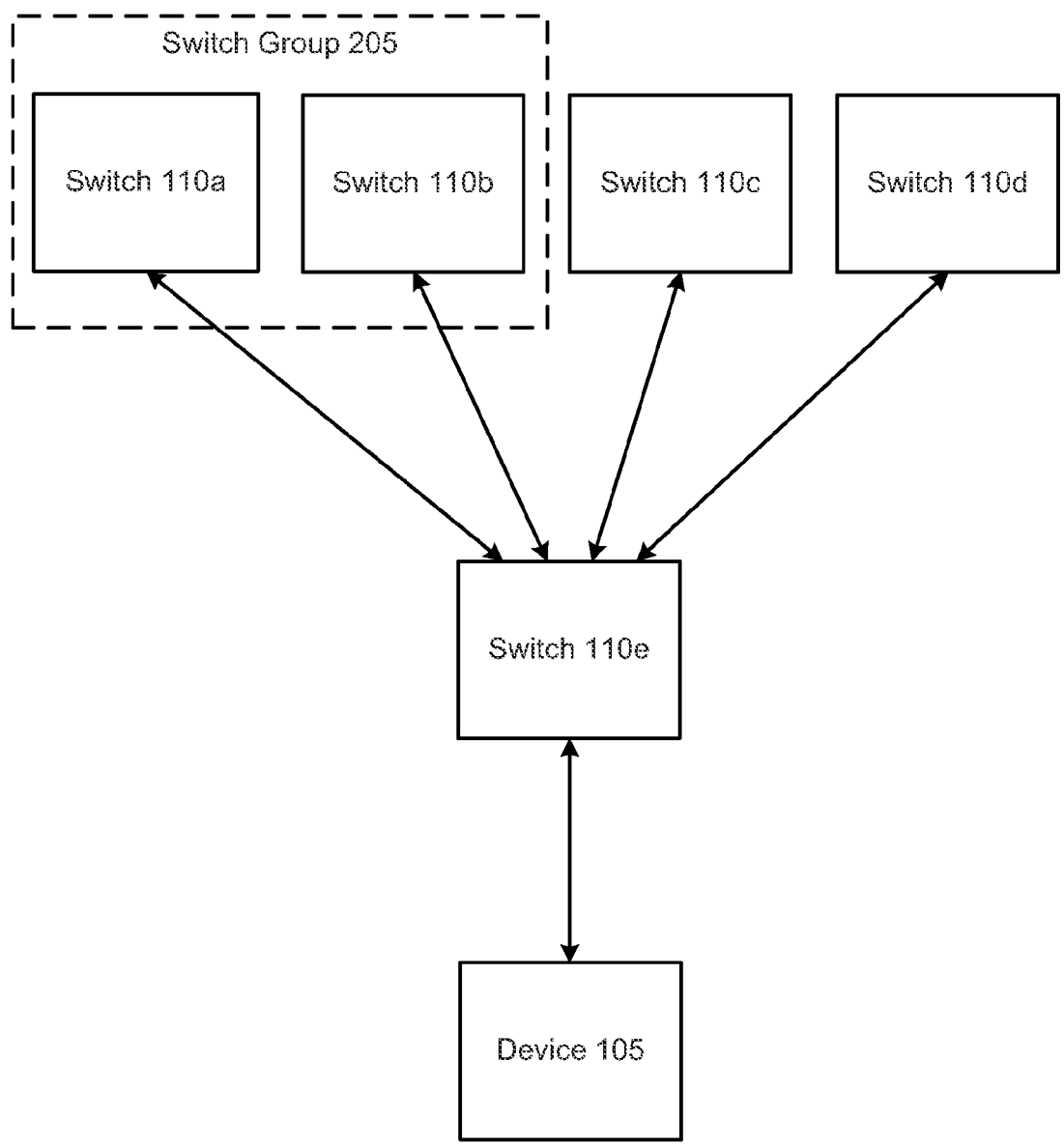
FIG. 2 is an illustration of an example environment 200 implementing a FabricPath network and including a switch group.

The edges switches 110a-d may be grouped into one or more switch groups. Such a switch group is illustrated by the switch group 205 of FIG. 2. As shown the switch group 205 includes the edges switches 110a and 110b. While the switch group 205 is shown as including two switches, it is for illustrative purposes only; there is no limit to the number of switches that may be part of a switch group.

The switches in the group 205 may provide both redundancy and load balancing with respect to network traffic between the FabricPath layer-2 network and a layer-3 network. In some implementations, the particular switches in the group 205 may be selected by a user or administrator using an interface provided by the FHRP modules. For example, an administrator may use an interface to select available switches to add to a group 205. The switches in the group 205 may include active switches, listening switches, and standby switches.

When a user or administrator creates a group 205, a group identifier may be created and assigned to the group by the FHRP module. In some implementations, the group identifier may be a virtual MAC. Other types of the identifiers may be used.

After the group identifier is created by the FHRP module, each switch in the group 205 may then configure itself to terminate layer-2 traffic (e.g., packets) for the group 205. The switches may be configured by the layer-2 forwarding module in each of the switches 110. For example, the FHRP module may provide a virtual MAC to for the group 205 to the layer-2 module. The switches 110 may be configured to terminate layer-2 traffic even if those switches are standby or listen switches.

For example, an administrator may create the group 205 that includes the switches 110a and 110b using an interface of the FHRP module. A virtual Mac may be assigned to the group 205 by the FHRP module, and each of the layer-2 forwarding modules of the switches 110a and 110b in the group 205 may configure themselves to terminate layer-2 traffic for packets sent to that virtual MAC address.

Each of the switches 110a-b in the group 205 may announce or publish their membership in group 205 to the other switches in the environment 200. The switches 110a-b may announce their membership in the group 205 by providing the group identifier assigned to the group. For example, the each of the switches 110a-b assigned to the group 205 may provide the virtual MAC, along with their switch identifiers to each of the switches 110 in the environment 200.

In some implementations, the layer-2 module in each of the switches 110a-b may push the virtual MAC and their switch identifier to the corresponding ISIS module executing on each of the switches 110a-b. The ISIS module may then provide the virtual MAC and switch identifier to the ISIS modules of the other switches 110 in the environment 200 using a type length value (TLV) packet. Other methods may also be used.

The switches 110 not in the group 205 may receive the group identifier and switch identifiers from the switches 110a-b in the group 205, and may associate the group identifier with the switch identifiers such that if a packet is received for a switch in the group 205 the packet will be forwarded to one of the identified switches. For example, if the switch 110e receives a packet from the device 105 with the group identifier, the switch 110e may forward the packet to one of the switches 110a-b in the group 205.

In some implementations, the ISIS module of the switch 110e may receive the virtual MAC and the switch identifiers, and may provide them to the layer-2 module of the switch 110e. The layer-2 module may then add the virtual MAC to a mapping that associates the virtual MAC with the switch identifiers of the switches 110a-b. The mapping may be implemented using a table or other data structure.

At a later time, the switch 110e may receive a packet with a virtual MAC that matches the virtual MAC of the group 205. The packet may include a MAC-in-MAC header that includes the virtual MAC. The layer-2 module of the switch 110e may process the MAC-in-MAC header to retrieve the virtual MAC.

The layer-2 module of the switch 110e may locate the virtual MAC in the mapping and determine the switch identifiers associated with the virtual MAC. The layer-2 module may then select one of the determined switch identifiers, and may provide the packet to the switch identified by the selected identifier. In some implementations, the layer-2 module may further replace the virtual MAC in the packet with the selected switch identifier.

The switch identifier may be selected by the layer-2 module of the switch 110e to provide load balancing among the switches 110a-b in the group 205. In some implementations, the layer-2 module may randomly select a switch identifier from the switch identifiers associated with the virtual MAC. For example, the layer-2 module may use a random or pseudo-random input such as a system time to select the switch identifier. Other methods for load balancing such as round-robin may also be used.

At a later time, one of the switches 110a-b in the group 205 may want or need to leave the group 205. For example, the switch 110b may no longer be able to forward layer-three traffic because of one or more connection problems, or a user or administrator may decide to remove the switch 110b from the group 205. In such cases, the FHRP module of switch 110b may disassociate itself from group identifier associated with the group 205. In some implementations, the FHRP module may disassociate itself with the group identifier (i.e., virtual MAC) by clearing a bit, such as a g/w bit, associated with virtual MAC.

After the bit is cleared, the layer-2 module of the switch 110b may issue a command to delete the virtual MAC from the switch 110b, and may pass the command to the ISIS module of the switch 110b, which may then pass the command to the other switches in the environment 200. The command may include the virtual MAC, and the switch identifier of the switch 110b. The other switches (including the switch 110e) may receive the command from their corresponding ISIS modules, and may disassociate the switch identifier of the switch 110b from the virtual MAC.

For example, the layer-2 module of the switch 110e may remove the switch identifier of the switch 110b from the mapping that associates the switch 110e with the virtual MAC. When a subsequent packet is received by the switch 110e from the device 105 with a MAC-in-MAC header that matches the virtual MAC, the switch 110b may no longer be considered by the load balancing algorithm used by the layer-2 module when considering which switch of the group 205 to forward the packet to.

At a later time, one or more of the switches in the group 205 may die or otherwise become unavailable or unresponsive. For example, the switch 110a may fail. The failure of the switch 110a may be detected by one or more of the switches 110 in the environment 200. In some implementation, one or more of the ISIS modules of the switches 110 may periodically send hello messages to the other routers in the environment 200. The hello messages may serve two purposes. The first purpose may be to announce the availability of a particular switch. For example, the ISIS component of the switch 110e may have sent hello messages to the other switches 110 in the environment 200 when it joined the environment 200 to let the other switches 110 know that is available.

The second purpose may be to verify the continuing availability of the switches 110. For example, the ISIS component of the switch 110e may periodically send hello messages to the switches 110 in the environment 200 that it is aware of. If it does not receive a hello packet in return after some predetermined amount of time it may determine that the switch is unavailable.

Continuing the example described above, to avoid packets addressed to the virtual MAC of the group 205 being forwarded to the failed switch 110a, the ISIS module may notify the layer-2 module of the switch 110e that the switch 110a is not responding to the hello message.

In order to avoid sending packets to the unavailable switch 110a, the layer-2 module component of the switch 110e may then disassociate the switch identifier of the switch 110a from the virtual MAC of the group 205. For example, the layer-2 module of the switch 110e may remove the switch identifier of the switch 110a from the mapping that associates the switch 110e with the virtual MAC. When a subsequent packet is received by the switch 110e from the device 105 with a MAC-in-MAC header that matches the virtual MAC, the switch 110a may no longer be considered by the layer-2 module when considering which switch 110 of the group 205 to forward the packet to.

Figure 3:
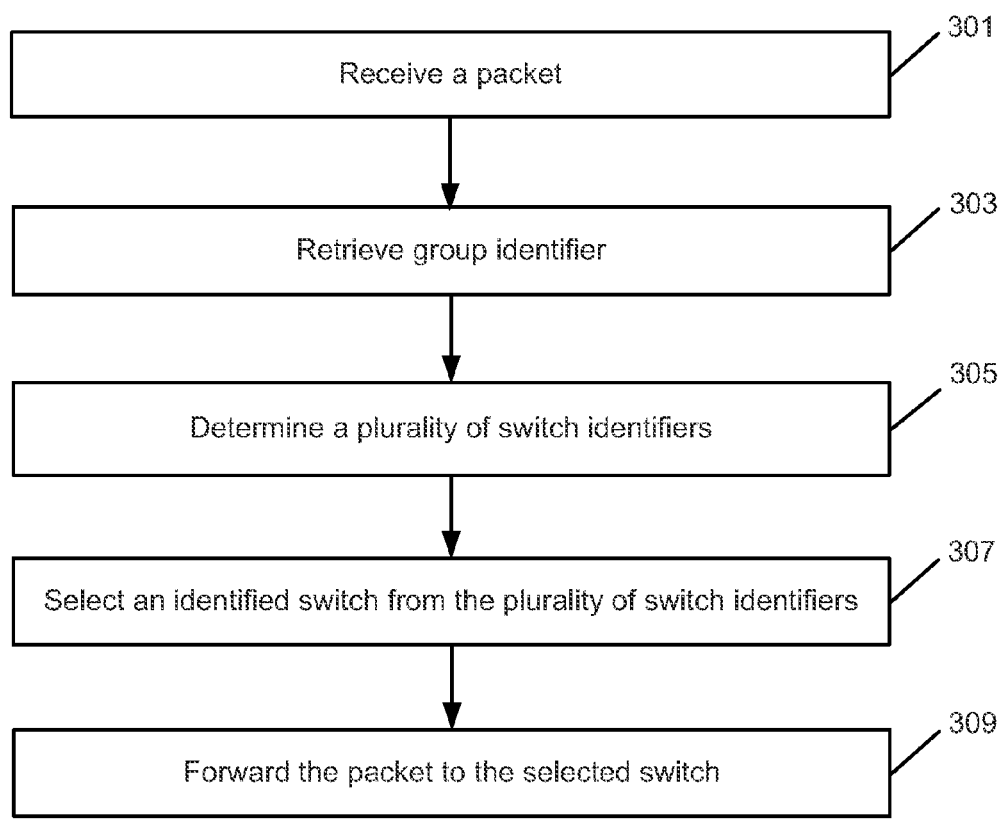
FIG. 3 is an illustration of a method for providing first hop load balancing in a FabricPath network of switches.

FIG. 3 is an illustration of a method 300 for providing first hop load balancing in a network of switches 110. The method 300 may be implemented by a switch 110, such as the switch 110e, for example.

A packet is received at switch from a network device (301). The packet may be received by the switch 110e from the device 105. In some implementations, the switch 110e may be part of a FabricPath network, and the device 105 may be a CE device.

A group identifier is retrieved from the received packet (303). The group identifier may be retrieved from the packet by the layer-2 module of the switch 110e. In some implementations, the group identifier is a virtual MAC address and is associated with a plurality of switch identifiers. The plurality of switch identifiers may be part of a group 205 associated with the virtual MAC address. The virtual MAC address may be retrieved from a header of the received packet, such as a MAC-in-MAC header. Other types of headers may also be used.

A plurality of switch identifiers that are associated with the group identifier are determined (305). The plurality of switch identifiers may be determined from a mapping of virtual MAC addresses to switch identifiers by the layer-2 module of the switch 110e.

A switch identifier from the plurality of switch identifiers is selected (307). The switch identifier may be selected from the plurality of switch identifiers by the layer-2 module of the switch 110e. In some implementations, the switch identifier may be selected using a load balancing algorithm to provide load balancing among the identified switches in the plurality of switch identifiers. In other implementations, the switch identifier may be randomly selected by the switch 110e based on a random or pseudo-random input such as a system time. Other methods may also be used.

The received packet is forwarded to the switch identified by the selected switch identifier (309). The packet may be forwarded to the switch by the layer-2 module of the switch 110e. In some implementations, prior to forwarding the packet to the identified switch, the layer-2 module may replace the virtual MAC address in the packet header with the selected switch identifier.

Figure 4:
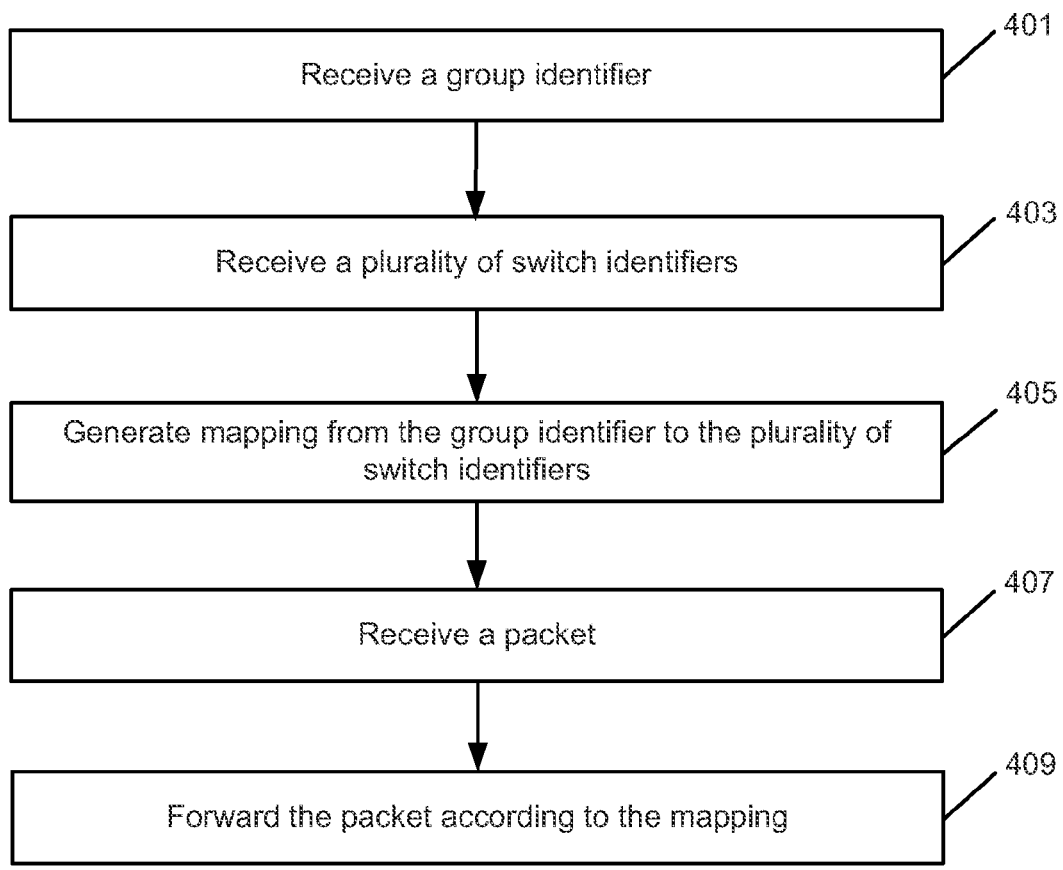
FIG. 4 is an illustration of another method for providing first hop load balancing in a FabricPath network of switches.

FIG. 4 is another illustration of a method 400 for providing first hop load balancing in a network of switches 110. The method 400 may be implemented by a switch 110, such as the switch 110e, for example.

A group identifier is received by a switch (401). The group identifier may be received by the ISIS module of the switch 110e through a protocol such as the ISIS protocol. The group identifier may be received from the FHRP module on the switch 110e, or from an ISIS module of another switch. The switch 110e may be a FabricPath device. The group identifier may be a virtual MAC and may be associated with a plurality of switches.

A plurality of switch identifiers is received (403). The plurality of switch identifiers may be received by the ISIS module of the switch 110e. The identifiers may identify the switches associated with the identified group and may be received along with the group identifier.

A mapping from the group identifier to the plurality of switch identifiers is generated (405). The mapping may be generated by the layer-2 module of the switch 110e. The mapping may be a data structure such as a table, and may be used by the layer-2 module of the switch 110e to forward packets that are directed to the identified group (e.g., the virtual MAC).

A packet is received (407). The packet may be received by the layer-2 module of the switch 110e from a network device 105. The network device 105 may be a CE device. The received packet may include a header that includes the group identifier. In some implementations, the header may be a MAC-in-MAC header and the group identifier may be a virtual MAC.

The received packet is forwarded to one of the identified switches according to the mapping (409). The packet may be forwarded by the layer-2 module of the switch 110e. In some implementations, the layer-2 module may use the mapping to select one of the switch identifiers of the plurality of switch identifiers associated with the group identifier. The selected one of the plurality of switch identifiers may be selected to provide load balancing among the identified switches. In some implementations, the switch identifier may be randomly selected. Other load balancing techniques may be used.

Figure 5:
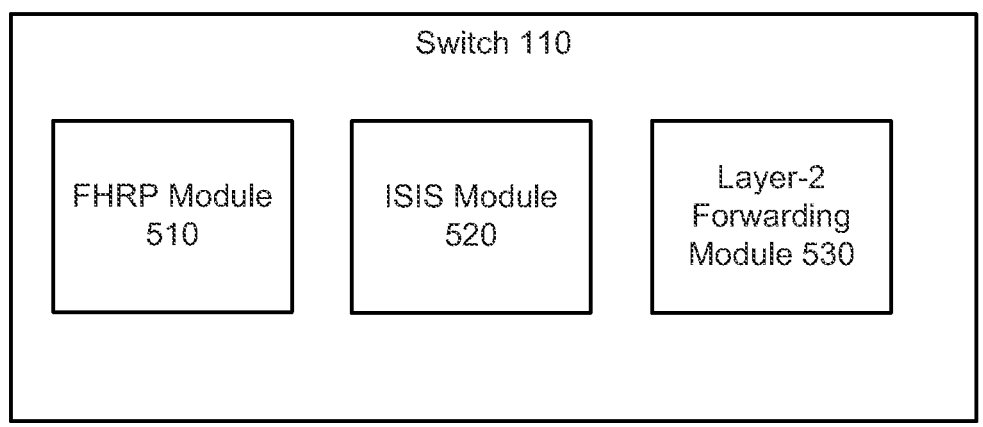
FIG. 5 is an illustration of an example switch.

FIG. 5 is an illustration of an example switch 500. As shown, the switch 500 includes several modules including a FHRP module 510, an ISIS module 520, and a layer-2 forwarding module 530. The switch 500 may be a layer-2 FabricPath switch, and may be implemented using a computing device 600 illustrated with respect to FIG. 6.

FHRP module 510 may be used to create or designate one or more switch or FHRP groups. In some implementations, the FHRP module may provide or expose an interface that a user or administrator may use to create a switch group, or to add or remove switches to an existing switch group. The FHRP may further assign a group identifier to a switch group, such as virtual MAC. The FHRP module 510 may provide the group identifier and the identifiers of the switches in the group to the ISIS module 520.

The ISIS module 520 may use the ISIS protocol to communicate with ISIS modules 520 of other switches in a network. The ISIS module 520 may use the communications to determine which switches are available, and which switches have failed, or have become unavailable. The ISIS module 520 may communicate the group identifier of a created group and the associated switch identifiers to the ISIS modules 520 of the other switches in the network. The ISIS module 520 may also provide group identifiers and associated switch identifiers to the layer-2 forwarding module.

The layer-2 forwarding module 530 may create a mapping from the group identifier to the switch identifiers associated with a group. The layer-2 forwarding module 530 may receive packets from a network device, and may retrieve a group identifier from the received packet. The layer-2 forwarding module 530 may then use the mapping to select one of the switch identifiers associated with the group identifier using a load balancing algorithm. The layer-2 forwarding module 530 may encapsulate the received packet with the selected switch identifier, and may forward the packet to the selected switch identifier.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing system 600. In its most basic configuration, computing system 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing system 600 may have additional features/functionality. For example, computing system 600 may include additional storage (removable and/or non-removable) including, but not limited to, magnetic or optical disks or tape. Such additional storage is illustrated in FIG. 6 by removable storage 608 and non-removable storage 610.

Computing system 600 typically includes a variety of computer readable media. Computer readable media can be any available media that can be accessed by computing system 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 600. Any such computer storage media may be part of computing system 600.

Computing system 600 may contain communications connection(s) 612 that allow the device to communicate with other devices. Computing system 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a packet from a network device;
   retrieving a group identifier from the received packet, the group identifier being a virtual MAC address associated with a predetermined plurality of anycast switches assigned to a switch group associated with the group identified in advance of receiving the packet, the switch group being one of a plurality of switch groups in a network;
   advertising, from the anycast switches, membership of the anycast switches in a group using the group identifier and the switch identifiers;
   maintaining a list of anycast switches from within the switch group that have advertised reachability for this group identifier;
   selecting one of the switch identifiers from the plurality of anycast switch identifiers; and
   forwarding the received packet to a selected anycast switch.

2. The method of claim 1, wherein the group identifier further comprises a gateway.

3. The method of claim 2, wherein retrieving the group identifier from the received packet comprises retrieving the gateway or virtual MAC address from a MAC-in-MAC header of the received packet.

4. The method of claim 3, further comprising encapsulating the received packet with an additional ethernet header using the selected switch identifier.

5. The method of claim 4, wherein encapsulating the received packet comprises adding the MAC-in-MAC header, using the selected switch identifier.

6. The method of claim 1, wherein the 'anycast' switch is one of a Layer-2 Ethernet Switch, First hop gateway, default gateway, and a router.

7. The method of claim 1, wherein selecting a switch identifier from the plurality of anycast switch identifiers comprises selecting a switch identifier from the plurality of anycast switch identifiers using a load balancing algorithm.

8. The method of claim 1, wherein selecting a switch identifier from the plurality of anycast switch identifiers comprises randomly selecting a switch identifier from the plurality of anycast switch identifiers.

9. The method of claim 1, wherein the plurality of anycast switch identifiers that are associated with the retrieved group identifier are determined using a mapping of group identifiers to pluralities of anycast switch identifiers.

10. The method of claim 9, further comprising:
    receiving an identifier of an anycast switch that is unavailable; and
    disassociating the identifier of the anycast switch that is unavailable from the load balance set on a group identifier.

11. The method of claim 1, wherein the network device is a classic Ethernet device.

12. A method comprising:
    defining a layer-2 switch group that includes a predetermined plurality of layer-2 switches, the switch group being associated with a group identifier and being one of a plurality of switch groups in a network;
    receiving an advertisement of the group identifier at a layer-2 switch, the group identifier being a virtual MAC address associated with the predetermined plurality of layer-2 switches;
    receiving an advertisement of a plurality of switch identifiers at the layer-2 switch, wherein the plurality of switch identifiers are associated with the received group identifier;
    generating a mapping from the group identifier to the plurality of switch identifiers by the layer-2 switch;
    receiving a packet by the layer-2 switch, wherein the packet includes the group identifier; and
    forwarding the received packet to a switch identified by one of the plurality of switch identifiers according to the mapping by the layer-2 switch.

13. The method of claim 12, wherein the packet is received from a CE device.

14. The method of claim 12, wherein the group identifier further comprises a gateway.

15. The method of claim 12, wherein the group identifier is received using a link state protocol, the method further comprising:
    advertising the group identifier using ISIS protocol; and
    communicating between the anycast switches and other layer-2 switches such that each layer-2 switch learns about other layer-2 switches within a network topology as well about the group identifiers.

16. The method of claim 12, wherein forwarding the received packet to a switch identified by one of the plurality of switch identifiers according to the mapping comprises selecting one of the plurality of switch identifiers that maps to the group identifier using a load balancing algorithm, and forwarding the received packet to the switch identified by the selected switch identifier.

17. The method of claim 12, wherein forwarding the received packet to a switch identified by one of the plurality of switch identifiers according to the mapping comprises randomly selecting one of the plurality of switch identifiers that maps to the group identifier, and forwarding the received packet to the switch identified by the selected switch identifier.

18. A layer-2 switch adapted to:
    receive a packet from a network device;
    receive an advertisement from a plurality of anycast switches, the advertisement indicating membership of the plurality of anycast switches in a group using the group identifier and the switch identifiers;

retrieve a group identifier from the received packet, the group identifier being a virtual MAC address associated with the plurality of anycast switches assigned to a switch group associated with the group identified in advance of receiving the packet, the switch group being one of a plurality of switch groups in a network;

determine a plurality of anycast switch identifiers from within the switch group that are associated with the retrieved group identifier;

select a switch identifier from the plurality of anycast switch identifiers; and forward the received packet to the anycast switch identified by the selected switch identifier.

19. The layer-2 switch of claim 18, wherein retrieving the group identifier from the received packet comprises retrieving the virtual MAC address from a MAC-in-MAC header of the received packet.

* * * * *